United States Patent Office 3,083,298
Patented Mar. 26, 1963

---

3,083,298
METHOD OF WEIGHT DETERMINATION
Earl Randall Parker, Berkeley, Calif., assignor to General Dynamics Corporation, New York, N.Y., a corporation of Delaware
No Drawing. Filed Sept. 18, 1959, Ser. No. 840,812
6 Claims. (Cl. 250—106)

The present invention generally relates to means for weight determination. More particularly, it relates to an accurate method for measuring the weight of large masses of material such as oil, metals, rubber, water and other liquids, and the like.

In the processing of such materials as metals, oil, rubber, etc. in large quantities, it is of considerable importance to have an accurate determination of the weight of the material being processed. For example, in order to accurately control the processing conditions or facilitate accurate additions of necessary ingredients to the material being processed, the weight of the material is desirably known, to provide the most satisfactory processing conditions or an end product of particular composition. However, certain materials are particularly difficult to weigh under the usual processing conditions. Existing procedures for weight determination frequently are crude and inaccurate or are relatively expensive and difficult to perform.

For example, during the production of such metals as iron, steel, copper, aluminum, nickel and the like, it is difficult to gain an accurate determination of the weight of the molten metal due in part to its molten condition and also to the extremely large quantity usually processed, which is sometimes of the order of hundreds of tons in one furnace, open hearth, or the like. Similar difficulties are encountered in the oil, rubber, etc., industries, where mass production may involve the handling of very large quantities.

The inability to accurately weigh such large quantities and the considerable difficulties connected therewith often result in considerable loss and unnecessary expense connected with the production of certain materials. In this connection, it has been determined that the average accuracy of weighing of iron in an open hearth is of the order of approximately 5 to 10 percent. Accordingly, alloying materials cannot be added with a high degree of accuracy and the desired steel may not be obtained. In view of such uncertainty, extra amounts of alloying metals, which are much more expensive than the iron, may have to be added. Substantial savings in steel making could be made in the event that a more accurate determination of the quantity of iron in the open hearth, blast furnace, ladle, or the like could be provided.

Accordingly, a substantial need has existed for an accurate method for measuring the weight of large masses of materials, such as oils, metals, rubber, food and the like which can be readily employed. Such a method must be capable of being integrated into conventional processes with minimum difficulty and time so that the cost of the measuring method is not prohibitive.

Therefore, an object of this invention is to provide a method for readily determining the weights of large quantities of material during processing thereof. These and other objects of the invention are accomplished by a method which utilizes the radioactivity of short-lived radioactive isotopes which are uniformly dispersed in a material, the activity of the resultant material being measured to provide an accurate quantitative determination. The method of the invention not only is highly effective, but is safe and does not impair the product. Although it has particular application in the iron and steel making industry, and in the production of such metals as copper, nickel, aluminum and the like, it is also applicable in various other fields, including oil, rubber, foods, etc.

An important part of the present invention is the selection of radioisotopes which do not present a hazard to personnel by contaminating the product for extended periods of time. In this connection, selected materials are utilized, the radioisotopes of which are short-lived, the presence of long-lived radioisotopes in the product being negligible. The long-lived radioisotopes, when present, contribute an amount of radiation less than normal background radiation. The decay of the radioisotopes with short half-lives is sufficiently rapid so that radiation hazards are eliminated.

Moreover, the radioactive isotopes which are added into the mass to be measured must be present in sufficiently small amounts so that they do not materially interfere with or detract from the desirable properties of the product. Instead, one or more radioisotopes may be selected which enhance the properties of the product.

The radioisotope should remain with the material which is to be weighed rather than migrating into or reacting with other substances including byproducts which may be present in the system. This is important to assure accurate weight determination.

The radioisotope, of course, should not volatilize at the processing temperature encountered during the weight determination. Also, it should be entirely miscible with the material being weighed.

In addition, the radioisotope should emit high energy gamma radiation, so that accurate detection thereof can be readily made.

It has been found that certain selected metals when made radioactive are highly suitable for use in the measuring of the weight of large quantities of substances, such as the foregoing. They have particular application to iron and steel, for, among other reasons, they do not tend to oxidize under the process conditions and go into the slag which forms in the process, but remain in the reduced molten metal; that is, they themselves do not form part of the slag. These radioactive metals are reduced to a higher degree than the metal mass to be weighed. Accordingly, an accurate weight determination of the metal can be made. Such selected radioactive metals are successfully utilized in the method of the present invention with safety and precision.

As above indicated, the method of the present invention involves measuring the weight of large masses, wherein radioisotopes having relatively short half-lives are added, and, more specifically involves the dilution of a known radioactivity in a mass, the weight of which is to be determined.

In accordance with the method of the present invention, a radioisotope, which has been carefully selected and which has been made radioactive, as hereinafter more fully described, is tested for its radioactivity and added to a material, the weight of which or a resultant product from which is to be determined. It is then uniformly dispersed therein. Thereafter, a sample is taken from the material and the radioactivity thereof is measured, and the sample weighed. From the known radioactivity of the radioisotope before introduction into the material and the known radioactivity and weight of the sample taken of the material to be weighed correlated with the decay characteristics, the weight of the entire mass of material to be weighed is determinable with a high degree of accuracy.

Thus, the method of the present invention utilizes dilution of radioactivity wherein the extent of dilution is indicative of the weight of a mass of material. Account must be taken of the self-shielding effects of the material in which the radioisotope is diluted and, as indicated, of radioactive decay characteristics. The method of the present invention provides a greatly improved degree of precision in weight determination and marks a great advancement in the art. In this connection, the method of the present invention makes possible weight determinations accurate to plus or minus 1 percent, even on masses ranging up to 200 tons or more.

Now more particularly considering the steps of the method of the present invention, at least one radioactive sample of metal carefully selected in accordance with the principles set forth hereinbefore and below is provided. The selected radioactive metal is one which is readily dispersed in and totally miscible with the material with which it is to be combined. In this connection, the radioactive metal is capable of remaining with the metal which is to be measured so that in processes where slag is formed or reactions occur, the radioactive metal added is not removed in the slag and does not otherwise leave the material to be measured. Moreover, the selected metal in its radioactive state has a major proportion of short-lived radioisotopes having half-lives preferably of not more than about five days, most preferably between about 15 minutes and 15 hours. At most, a minor, negligible amount of radiation from long-lived radioisotopes is present. Such radiation should be below normal background radiation levels. Moreover, the metal to be activated does not impair the properties of and preferably is beneficial to the material which is being weighed. Of even more importance, the radioactive metal has easily determinable radiation, that is, high energy gamma radiation, so that it can be conveniently and accurately measured by a sodium iodine scintillation detector or the like.

A number of metals are suitable for activation for the purposes of the present invention. These include nickel, copper, gold, platinum, iridium, osmium, palladium, silver, rhodium, ruthenium, molybdenum, tungsten and indium, among others. However, nickel, copper, gold and platinum are preferred, with nickel and copper being the most suitable for most purposes.

Nickel is preferred, due to its low cost, and also its desirable alloying properties in iron and steel, as well as its short-lived radioisotopes and other features. The irradiation of nickel of high purity by a neutron source results in the production of three long-lived nickel radioisotopes in addition to one short-lived nickel radioisotope. The irradiation is preferably carried out on ultra-pure (about 99.99 percent) nickel sponge which is commercially available. In this connection, $Ni^{65}$ has a half-life of 2.56 hours. The longer-lived species are $Ni^{63}$ with a half-life of 80 years, $Ni^{59}$ with a half-life of $8 \times 10^4$ years, and $Co^{58}$ with a half-life of 72 days, the latter compound being produced during the irradiation of the nickel.

When ultra-pure nickel is irradiated by a typical neutron irradiation facility having a suitable high neutron flux, the total activity level of the indicated long-lived isotopes emanating gamma rays from, for example, steel plate or the like, is usually less than 5 percent of the average omnipresent activity level of the area. Such background activity is due to normally occurring cosmic rays, radium, uranium and thorium present in the plaster and bricks of the area, for example, a steel plant, the radioactivity of natural $K^{40}$ and $C^{14}$ in the steel plate, and the gammas from fallout debris which is usually present. Normal background radiation, of course, is not harmful to humans. Photographic film laid on steel processed by utilizing $Ni^{65}$ in an amount just sufficient for the purposes of the present invention and containing the longer-lived isotopes in their normal concentration as produced by a high flux neutron source, cannot detect the long-lived $Ni^{63}$ and $Ni^{59}$ and the $Co^{58}$ present in the steel as a result of the introduction of the irradiated nickel containing $Ni^{65}$. In practicing the method of the present invention, radiation to personnel is minimal. Thus, if an operator handles 80 nickel radioisotope samples weekly (about four times the expected amount) with the usual precautionary measures, only 1 percent of the AEC (Atomic Energy Commission) tolerance level regulation is reached.

Copper is similarly suitable for the purposes of the present invention, due to its low cost, alloyability, short-lived radioisotopes and ready detectability in the radioactive state. When irradiated by a neutron source to provider radioisotopes, a mixture of $Cu^{64}$ of a half-life of 12.8 hours, and $Cu^{66}$ with a half-life of 5 minutes is produced. No longer-lived radioistopes are present.

The irradiation of gold to form radioisotopes provides a single radioisotope, $Au^{198}$ with a half-life of 2.7 days. No longer-lived radioisotopes are produced. Accordingly, radioactive gold is safe for use in the method of the present invention. So also is radioactive platinum. The irradiation of platinum produces three radioistopoes, $Pt^{191}$ with a half-life of 4.3 days, $Pt^{199}$ with a half-life of 31 minutes, and $Pt^{197}$ with a half-life of 18 hours.

None of the suitable radioisotopes utilized in the present method produce new activity in appreciable amounts as a result of radioactive decay. Furthermore, the radioisotopes do not cause metallurgical damage to the molten metal to which they are added.

Accordingly, the method of the present invention is safe for use. Various estimates of the likely exposure of personnel to irradiation from the indicated radioisotopes in the production of steel containing the same indicate that no apprecibale irradiation is likely to occur, utilizing normal precautions.

The radioisotopes to be used in the weight determination can be produced in any suitable radiation facility. Thus, for example, it has been found to be convenient and useful to employ a neutron source such as the thermal neutron reactor commercially known as TRIGA and manufactured by the General Atomic Division of General Dynamics Corporation. The neutron source should have a sufficiently high neutron flux and specimen capacity to produce $Ni^{65}$ radioisotope or the comparable short-lived $Au^{198}$, $Pt^{197}$, $Pt^{191}$ and $Pt^{199}$, $Cu^{64}$, $Cu^{66}$, etc. radioisotopcs in conveniently large amounts and within a reasonable period of time.

The TRIGA neutronic reactor is highly suitable for these purposes, being provided with a considerable amount of specimen capacity and a high neutron flux, of the order of $7 \times 10^{11}$ neutrons per square centimeter per second at 100 kw. output, at the specimen rack located in its reflector. The neutron flux for the TRIGA when operating at 10 kw. output is approximately $7 \times 10^{10}$ neutrons per square centimeter per second. However, the lower neutron flux is usually somewhat less desirable in the production of the indicated radioisotopes.

Whatever irradiation facility is utilized, a sufficient amount of the desired short-lived radioisotope or a mixture thereof should be obtained to conduct the desired weight determination. In view of the relatively short half-lives of most of the useful radioisotopes, it will be obvious that production of the radioisotopes at the point of use, for example, the steel mills, will in many instances be much preferred.

In accordance with the present invention, the radioactivity level of the desired short-lived radioisotope or radioisotopes so produced may be measured by any suitable conventional high energy gamma counting means, for example, a Geiger-Müller counter, ionization chambers, etc. Preferably, however, a sodium iodide or other similar scintillation counter is utilized. The radioactivity level of the mass of newly formed radioisotope(s) to be used in the weighing procedure is accurately determined and the time of the determination may be determined.

The amount of radioisotope material to be utilized in the weighing procedure may be small, but of course should be sufficiently large so that when it is diluted in the mass to be weighed the radiation level of a suitable sample of the mass taken within a reasonable amount of time will be sufficiently high to be accurately detected. For the purposes of the present invention and for identification hereinafter, the radioisotope material may contain one or a plurality of radioisotopes of a single metal or a plurality of metals. In most instances, the amount of such material used may be of the order of about 100 grams or less, even when utilized in a mass of metal of up to 100 tons or more. Selection of the most suitable amounts of the radioisotope material to be used is within the skill of the art.

A suitable amount of the radioisotope material or tracer is then substantially uniformly dispersed within the entire mass of material to be measured. The radioisotope material is preferably in finely divided form to aid in the dispersing. Obviously, the material to be weighed should be in a flowable, fluid-like or molten state, such as molten iron, copper, aluminun or the like, liquid rubber, etc., so that uniform distribution of the radioisotopes in the material to be weighed can be carried out. If the material to be weighed is in finely divided form, such as powdered metal, sand, etc., the radioisotopes can be distributed therethrough upon continued agitation of the bulk of the mass if the radioisotopes are also in finely divided form, as by any suitable agitation means, i.e., beaters, etc. However, in the case of molten metal, usually there is a sufficient amount of convection, bubbling, etc., in the molten mass to provide a sufficient agitation to rapidly and uniformly distribute the radioisotope material therein.

It will be understood that in those metal systems where slag may be present during the weight determination, radioisotopes must be selected which do not have a tendency to migrate to and pass out in the slag. Nickel, copper, gold and platinum, among others, have all been found to be particularly suitable, in that they are easily retained in the molten steel and iron and do not migrate into or form part of the slag.

After the radioisotope material is uniformly distributed in the mass to be weighed, a sample of the mass is withdrawn. Such withdrawal can be carried out immediately or at some convenient subsequent processing stage, but within a reasonable amount of time, from the standpoint of the amount of radioisotopes used, their half-lives, etc.

After withdrawal of the radioisotope-containing sample of the mass, such sample is accurately weighed and the radioactivity is again accurately measured, as by the previously described gamma radiation measuring means. The time of taking the radioactivity measurement is carefully noted.

The entire weight of the mass from which the sample was withdrawn can then be readily calculated. The same ratio exists between the initial radioactivity of the radioisotope material added to the mass of material to be weighed and the radioactivity of the sample withdrawn from the mass of material to be weighed as exists between the total weight of the material to be weighed and the weight of the sample withdrawn. Accordingly, a comparison is made of the respective indicated radioactivities in determining the weight of the mass of material.

Of course, suitable corrections should be made for the decrease in radioactivity due to the radioactive decay with time of the radioisotope material, and also the self-shielding effects brought about by the dilution of the radioisotope material in the substantially non-radioactive portion of the sample. A further correction may be made for any substantial difference in the average distance from the radiation detector of the sample after withdrawal from the mass and the radioisotope material tested before introduction into the mass. In the latter instance there is the usual fall-off of radioactivity as the square of the distance from the detector.

The manner of carrying out the indicated corrections for sample geometry, radioactive decay, etc., are well known to those skilled in the art and need not be detailed here. They involve the application of well-known principles of physics, etc.

An advantageous variation in the basic method of the present invention contemplates the use of two portions of radioisotope material, one of the portions serving as a standard or measure of radiation decay. In this connection, one or more samples of the selected metal or metals can be irradiated simultaneously to provide the desired radioisotope material. Where a single sample is indicated, it can be divided into two portions, one preferably a relatively large portion and the other preferably a relatively small portion. Either, the radioactivity of the produced radioisotope material may be noted before division of the sample into two portions and the portions separately weighed; or, division of the sample may first occur and the radioactivity of each portion may be measured simultaneously and recorded. The relatively larger portion of radioisotope material is utilized in the previously described manner, i.e., by introduction into and uniform dispersion in the material to be weighed. In the previously described manner, a sample is then taken of the material to be weighed, and the radioactivity noted. The radioacitvity of the smaller portion of radioisotope material may be measured before and after or at the same time. With this system there is no necessity for correcting for the radioactive decay of the radioisotope material as a result of the considerable lapse of time between the initial determination of radioactivity of the radioisotope material and the second determination of radioactivity on the sample withdrawn from the material to be weighed, and the control portion of radioisotope material. This is true inasmuch as the control portion and larger portion of radioisotopes decay at the same rate.

The following specific examples further illustrate certain features of the present invention.

*Example I*

A precise determination of the amount of iron in an open hearth is carried out during the steel making process. A 100 gram sample of ultra-pure (99.99% pure) nickel sponge is irradiated for one hour at 100 kw. in a TRIGA neutronic reactor operating at a neutron flux of $7 \times 10^{11}$ neutrons per square centimeter per second. At the time of radiation the sample of nickel sponge is disposed in a 2 dram polyethylene vial and is situated in a rack in the reflector portion of the neutronic reactor. The polyethylene vial is essentially non-radioactive and remains essentially so.

After the irradiation, the nickel radioactivity is determined by a sodium iodide scintillation counter 3 inches in diameter and 3 inches thick, which counter is mounted in 0.032 inch Al and attached to a Du Mont 6292 photomultiplier tube. It is determined that the nickel essentially constitutes 110 millicuries of the radioisotope $Ni^{65}$, with minute, negligible amounts of the 80-year radioisotope $Ni^{63}$, $8 \times 10^4$-year $Ni^{59}$, and 72-day $CO^{58}$. The irradiated nickel sponge material constituting the radioisotope material is transferred in toto in a one-inch walled iron ladle to an open hearth, utilizing a 15 foot transfer pole. A period of ten minutes is allowed for convective mixing of the radioisotope material with the mass of iron in molten form within the open hearth. The mass of iron is roughly calculated to be approximately 200 tons.

A ladle is then utilized to withdraw a sufficient amount of the iron in molten form to pour a disc of iron in a water-cooled mold, which mold is 3 inches±0.01 inch in diameter and 2 inches±0.01 inch thick. The disk is allowed to cool for 5 minutes. The radioactivity of the $Ni^{65}$ in the disc is then determined through the use of a sodium iodide scintillation counter substantially identical to that previously described. In this connection, the radiation from the disc is counted for a period of two minutes. Appropriate corrections are carried out for the shielding effect of the iron in the disc and for the radioactive decay taking place in the radioisotopes from the time of first measuring thereof to the time of measuring of the disc. The weight of the disc is also determined.

The mass of the iron in the open hearth is then accurately determined. In this connection, the ratio of total radioactivity of the nickel sponge radioisotope material at the time of dispersion in the mass to that of the disc sample corrected as described is the same as the ratio of the total weight of the iron to that of the disc sample. Similar accurate determinations can be made utilizing automatic equipment, and standardizing weight measuring technique. Upon comparing the results of the weight determination against direct weight determinations made on the final product, it is found that the amount of iron in the open hearth is determined by the method of the present invention to a very small degree of error, less than ±1 percent by weight. Accordingly, the method of the present invention is found to provide highly improved results.

*Example II*

A second weight determination is made on a slightly smaller batch of molten iron than called for in Example I. The conditions, steps of the method, etc., are substantially identical to those set forth in Example I, except that 50 grams of the ultra-pure nickel sponge and 2 milliliters of a standard nitric acid solution of nickel (containing 3 mg. of nickel) are simultaneously irradiated in separate polyethylene vials in a TRIGA reactor at 100 kw. and a flux of $7 \times 10^{11}$ neutrons per square centimeter per second for 1 hour. The nickel sponge radioisotope material is found to have a radioactivity of 60 millicuries. It is added to the iron in the manner set forth in Example I and a sample of the mixture is, after 10 minutes, poured into the previously described disc form and allowed to cool 5 minutes before measuring the radioactivity and weight thereof. A half minute before the radioactivity of the disc is determined, that of the nickel solution is determined on the previously described scintillation counter. The radioactivity is then determined and, immediately afterwards, again that of the nickel solution.

The following typical formula is applied in calculating the total weight of iron in the open hearth:

$$\text{Total weight of iron in hearth} = \frac{DBf(a+b)g}{2dA}$$

where $A$ = mg. of irradiated Ni solution.
$a$ = integral counting rate of Ni solution 1 minute before disc is counted.
$b$ = integral counting rate of Ni solution 1 minute after disc is counted.
$B$ = mg. of irradiated Ni sponge dissolved in open hearth.
$D$ = weight of disc in pounds.
$d$ = integral counting rate of disc.
$f$ = calibration ratio of $Ni^{65}$ counting rate per mg. of Ni in disc to the $Ni^{65}$ counting rate per mg. of Ni in Ni solution.
$g$ = relative abundance of Fe in disc, as determined by spectrographic analysis.

When the figure for the total weight of iron in the open hearth, as derived by the present method, is compared with that determined by a combination of several other methods, the high degree of accuracy of the present method is confirmed. Moreover, over-all radiation at various stages during weight determination is maintained very low, utilizing AEC safety techniques.

*Example III*

A third weight determination is carried out on iron in accordance with the method of the present invention, utilizing the techniques set forth in Examples I and II. The iron is roughly estimated to be somewhere in the neighborhood of 200 tons. A 20 gram sample and a 20 mg. sample of ultra-pure copper are irradiated simultaneously at 10 kilowatts with a neutron flux of $0.7 \times 10^{11}$ neutrons per square centimeter per second for a period of 2 hours in a neutronic reactor. After the irradiation, the 20 gram sample of copper has a total radioactivity of 104 millicuries, while that of the 20 mg. sample is about 0.1 millicurie. The 20 gram sample of radioactive copper is transferred to the open hearth, allowed to mix with the molten iron for 15 minutes and then a sample is withdrawn, poured into the mold described in Examples I and II, and allowed to cool 5 minutes. Measurement of the radioactivity of the disc and also the 20 mg. sample is carried out in accordance with the procedure of Example II, and thereafter the weight of the iron is accurately determined, applying the formula set forth in Example II. The accuracy of weight determination is high and the total radiation exposure of personnel during practice of the method is very low.

*Example IV*

The procedure of Example I is utilized to determine the weight of a molten mass of aluminum of approximately 50 tons, utilizing radioactive gold. A total of 5 gm. of gold is irradiated for 4 hours at 10 kw. in a TRIGA neutronic reactor at a neutron flux of $0.7 \times 10^{11}$ neutrons per square centimeter per second. At the end of the period 120 millicuries of radioactive gold is obtained. This radioisotope material is added to molten aluminum and uniformly dispersed therein, after which a sample is withdrawn. In this instance, a disc of the previously described (Examples I, II and III) dimensions is poured, cooled, weighed and tested for radioactivity. Account is taken of radioactive decay and self-shielding by the aluminum of the disc. An accurate weight determination is made.

As set forth in the foregoing, the method of the present invention provides substantial savings to the iron and steel making industry by affording a simple, inexpensive and rapid way of accurately determining the weight of large masses of iron and steel. It is also suitable for use in determining the weight of masses of various other materials, including metals such as copper, aluminum, etc., rubber, foods, chemicals, oil, etc. In fact, the present method is useful wherever determination of the weight of a mass is to be carried out and that mass is in a flowable state.

Such modifications in the method of the present invention, in the steps thereof, in the materials and equipment for carrying out the steps, and in the products of the method, as are within the skill of those versed in the art are contemplated as being within the scope of the present invention.

What is claimed is the following.

I claim:

1. An improved method for weight determination of a flowable mass, which method comprises the steps of substantially uniformly dispersing in a flowable mass, the weight of which is to be determined, a radioactive material, the total radioactivity of which is known, at least a major proportion of said material consisting of radioisotopes having short half lives, the total radiation contributed by long-lived radioisotopes being below normal background radiation levels, said material being present in an amount sufficient to be detectable in said mass, withdrawing a sample from said mass, weighing said sample and determining the radioactivity thereof, and comparing the radioactivity of said sample with the radioactivity of said material prior to dispersing in said mass, whereby the total weight of said mass is readily determinable as a function of the degree of dilution of the radioactivity of said material in said mass.

2. An improved method for weight determination of a flowable mass, which method comprises the steps of substantially uniformly dispersing in a flowable mass, the weight of which is to be determined, a relatively nonvolatilizable radioisotope material compatible with said mass and miscible in said mass, the total initial radioactivity of said radioisotope material being known, at least a major proportion of said radioisotope material consisting of radioisotopes having short half lives of not more than about four days, the total radiation contributed by long-lived radioisotopes being below normal background radiation levels, said radioisotope material being present in an amount sufficient whereby the gamma radiation thereof is detectable in said mass, withdrawing a sample from said mass, weighing said sample and determining the radioactivity thereof, and comparing the radioactivity of said sample with said initial radioactivity of said radioisotope material, whereby the total weight of said mass is determinable as a function of the degree of dilution of the radioactivity of said radioisotope material in said mass.

3. An improved method for weight determination of a flowable mass, which method comprises the steps of irradiating metal to form a sufficient quantity of radioisotope material for weight determination of a given flowable mass, said metal being compatible with and miscible in said mass, said radioisotope material emitting sufficient gamma radiation to be detectable in said mass, measuring the initial radioactivity of said radioisotope material, substantially uniformly dispersing said flowable radioistope material in said mass, at least a major proportion of said material consisting of radioisotopes having short half lives not exceeding about four days, the total radiation contributed by long-lived radioisotopes being below normal background radiation levels, withdrawing a sufficiently large sample from said mass to detect the gamma radioactivity thereof, weighing said sample and determining the gamma radioactivity thereof, and comparing the radioactivity of said sample with the initial radioactivity of said material, whereby the total weight of said mass is readily determinable as a function of the degree of dilution of the radioactivity of said material in said mass.

4. An improved method for weight determination of a flowable mass, which method comprises the steps of irradiating metal compatible with a flowable mass to be weighed, and miscible therewith, said irradiation being carried out to provide sufficient radioistope material for a control and an addend to said flowable mass, said radioisotope material being substantially nonvolatilizable, measuring the initial radioactivity of said radioisotope material, substantially uniformly dispersing a portion of said radioisotope material in said flowable mass while retaining the remaining portion of said radioisotope material as a control, at least a major proportion of said radioisotope material consisting of radioisotopes having short half lives of not more than about four days, the total radiation contributed by long-lived radioisotopes being below normal background radiation levels, said radioisotope material being present in said mass in an amount sufficient whereby the gamma radiation thereof is detectable in said mass, withdrawing a sample from said mass, weighing said sample and determining the radioactivity thereof and also determining the radioactivity of said control, and comparing the radioactivity of said sample with said initial radioactivity of said radioisotope material and said radioactivity of said control, whereby the total weight of said mass is determinable as a function of the degree of dilution of the radioactivity of said radioisotope material in said mass.

5. An improved method for weight determination of a molten mass of iron during steel making, which method comprises the steps of substantially uniformly dispersing radioactive nickel in a molten mass of iron, the weight of which is to be determined, said radioactive nickel having been formed by neutron irradiation of high purity nickel, the initial radioactivity of said radioactive nickel being known, at least a major proportion of said radioactive nickel consisting of nickel 65, the total radiation contributed by longer lived radioisotopes of nickel being below normal background radiation levels, said radioactive nickel being present in an amount sufficient to be detectable in said molten iron, withdrawing a sample from said iron containing said radioactive nickel, weighing said sample and determining the radioactivity thereof, and comparing the radioactivity of said sample with said initial radioactivity of said nickel, whereby the total weight of said mass is readily determinable as a function of the degree of dilution of the radioactivity of said material in said mass.

6. An improved method for weight determination of a molten mass of iron during steel making, which method comprises the steps of substantially uniformly dispersing radioactive copper in a molten mass of iron, the weight of which is to be determined, said radioactive copper having been formed by neutron irradiation of high purity copper, the initial radioactivity of said radioactive copper being known, at least a major proportion of said radioactive copper consisting of copper 64 and copper 66, the total radiation contributed by longer lived radioisotopes of copper being below normal background radiation levels, said radioactive copper being present in an amount sufficient to be detectable in said molten iron, withdrawing a sample from said iron containing said radioactive copper, weighing said sample and determining the radioactivity thereof, and comparing the radioactivity of said sample with said initial radioactivity of said copper, whereby the total weight of said mass is readily determinable as a function of the degree of dilution of the radioactivity of said material in said mass.

References Cited in the file of this patent

UNITED STATES PATENTS

| | | |
|---|---|---|
| 2,365,553 | Hill | Dec. 19, 1944 |
| 2,680,900 | Linderman | June 15, 1954 |
| 2,750,144 | Beckwith | June 12, 1956 |
| 2,943,045 | Hull et al. | June 28, 1960 |
| 2,957,989 | Hull | Oct. 25, 1960 |

OTHER REFERENCES

Bacon: Radioactive Tracers Used in Corrosion Studies, General Electric Review, May 1949, pp. 7–9.

Burr et al.: Weighing Bagasse and Sugar With Gamma Rays, Hawaiian Sugar Technologists, 1954, pp. 124–126.

Ohmart-Foxboro Mass Flow Meter, Advance Bulletin 108, published Oct. 7, 1958, by the Ohmart Corp., 2236 Bogen Street, Cincinnati 22, Ohio.

UNITED STATES PATENT OFFICE

CERTIFICATE OF CORRECTION

Patent No. 3,083,298                          March 26, 1963

Earl Randall Parker

It is hereby certified that error appears in the above numbered patent requiring correction and that the said Letters Patent should read as corrected below.

Column 9, line 24, strike out "flowable" and insert the same after "said" in line 25, same column 9.

Signed and sealed this 19th day of November 1963.

(SEAL)
Attest:

ERNEST W. SWIDER

Attesting Officer

EDWIN L. REYNOLDS

Acting Commissioner of Patents